UNITED STATES PATENT OFFICE.

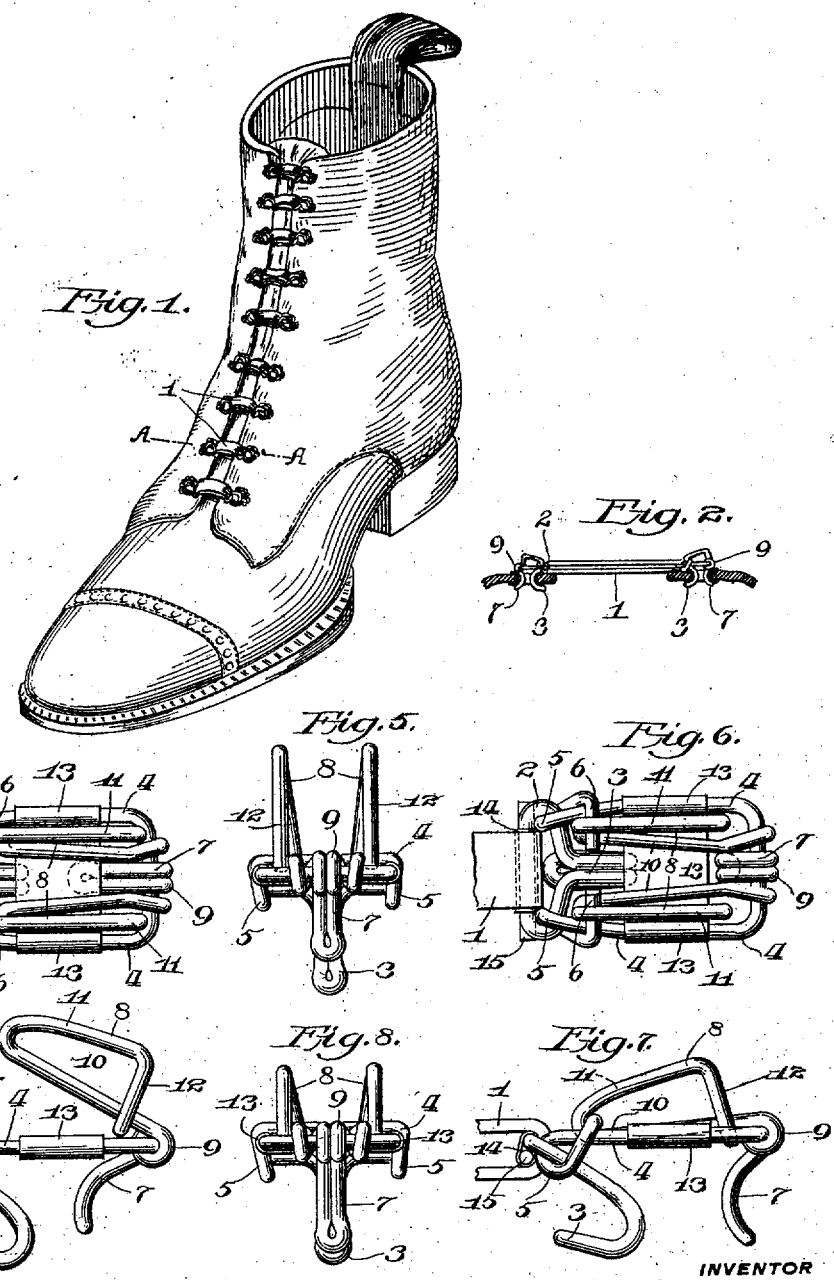

WILLIAM F. McDADE, OF MIDDLETOWN, PENNSYLVANIA.

FASTENING FOR SHOES, CORSETS, &c.

963,799.  Specification of Letters Patent.  Patented July 12, 1910.

Application filed October 5, 1909. Serial No. 521,110.

*To all whom it may concern:*

Be it known that I, WILLIAM F. McDADE, a citizen of the United States, and a resident of Middletown, in the county of Dauphin and State of Pennsylvania, have invented certain new and useful Improvements in Fastenings for Shoes, Corsets, &c., of which the following is a specification.

My invention relates to improvements in fastenings for shoes, corsets, or any other article furnished with eyelets and commonly fastened with a tape or lacing, the object of my invention being to furnish a fastening which may be conveniently and quickly applied and which will be elastic enough to permit the article which it secures to adjust itself to all movements of the foot or body.

In the accompanying drawings forming part of this specification and in which similar letters of reference indicate similar parts throughout the several views: Figure 1, is a perspective view of a shoe equipped with my fastening. Fig. 2, a section, enlarged, through two opposite eyelets, on line A—A, Fig. 1, showing the fastening. Fig. 3, a plan, enlarged, showing one fastening open. Fig. 4, a side elevation of Fig. 3. Fig. 5, an end elevation of Fig. 3. Fig. 6, a plan showing the fastening closed. Fig. 7, a side elevation of Fig. 6. Fig. 8, an end elevation of Fig. 7.

1 is an elastic connection, shown in the drawings as a rubber band, but any other suitable elastic material may be used, the opposite ends of which are secured to the eye 2 of a hook 3.

4 is a frame formed of a piece of wire the ends of which are secured to the eye 2 of the hook 3 by passing them downward therethrough and bending them so as to form loops 5. The extreme ends 6 of the wire forming the frame 4 are passed over the top of the frame, as best shown in Figs. 3 and 6, to secure the movable hook or fastening in place as presently described.

7 is a movable hook or fastening which is carried by the outer end of the frame 4. Preferably this hook is formed of a piece of wire secured to the frame by bending it around as shown.

8 is a catch carried by the hook 7 which is adapted to be engaged by the ends 6 of the frame 4 to hold the hook 7 in operative position. In the drawings the catch 8 is formed by a prolongation of the wire forming the hook 7, the hook being formed by the bight of the wire and the catch by the ends which, after being wound around the frame 4 at 9 pass, the one to one side of the frame, the other to the other side, backward at 10, then around upward and forward as at 11 and finally downward at 12. The catches or ends 8 can be pressed toward one another by the fingers so as to engage or disengage them with the ends 6 of the frame 4 which form stops for securing them.

13 is a guard carried by the frame 4 which serves as a stop to limit the movement of the hook 7 and attached parts.

14 is a chafing band carrying a thickening piece 15, carried by the eye 2 of the hook 3 around which the band 1 passes.

The fastening is put in place as follows: The hook 7 being open, as shown in Figs. 3, 4 and 5, the hook 3 is passed through an eyelet and brought firmly against its side, the hook 7 is then passed through this eyelet and its ends 8 are pinched together and brought down until they can be passed over the ends 6 of the frame 4 which hold them and the hook 7 in this position until they are manually released. The closed position of the hook 7 is shown in Figs. 6, 7 and 8, also in Fig. 2, from which it will be seen that the hooks 3 and 7 engage opposite sides of the eyelet in such a manner as to prevent their accidental dislodgment. The hooks having been secured to opposite eyelets the elastic connection between them permits any movement of the article secured by them without danger of breaking the fastenings or preventing a perfectly free movement of the member inclosed.

Having thus described my invention I claim as new and desire to secure by Letters Patent;

1. In a fastening, in combination, a frame, a substantially stationary hook carried at one end of said frame adapted to engage one side of an eyelet, a hook pivotally carried at the other end of said frame adapted to engage the opposite side of the eyelet, and means for locking said latter hook to said frame.

2. In a fastening, in combination, a frame formed of a wire the ends of which are bent to form stops, a hook secured to the end of said frame carrying said stops, and a hook, furnished with a catch adapted to be engaged by said stop, pivotally carried by the opposite end of said frame.

3. In a fastening, in combination, a frame formed of a wire the ends of which are bent to form loops and stops, a hook carried in said loops, a hook or fastening, furnished with a catch adapted to be engaged by said stops, pivotally carried by said frame, and a guard carried by said frame for limiting the movement of said latter hook.

WILLIAM F. McDADE.

Witnesses:
CHARLES A. RUTTER,
CHAS. HERMAN.